United States Patent [19]

Sakai

[11] Patent Number: 4,915,189

[45] Date of Patent: Apr. 10, 1990

[54] SYSTEM FOR CONTROLLING A TRANSFER CLUTCH OF A FOUR-WHEEL DRIVE VEHICLE

[75] Inventor: Yasuhito Sakai, Higashimurayama, Japan

[73] Assignee: Fuji Jukogyo Kabushiki Kaisha, Tokyo, Japan

[21] Appl. No.: 320,751

[22] Filed: Mar. 6, 1989

[30] Foreign Application Priority Data

Mar. 9, 1988 [JP] Japan ................. 63-055515

[51] Int. Cl.$^4$ ............................................. B60K 23/08
[52] U.S. Cl. ................................. 180/247; 364/424.01
[58] Field of Search ............... 180/247, 197, 248, 249, 180/250, 233, 245; 361/236; 364/424.01; 192/31, 32, 52, 53 R, 54

[56] References Cited

FOREIGN PATENT DOCUMENTS

60-64035 4/1985 Japan .
61-105352 5/1986 Japan .

Primary Examiner—Charles A. Marmor
Assistant Examiner—Richard Camby
Attorney, Agent, or Firm—Martin A. Farber

[57] ABSTRACT

A control system for a four-wheel drive vehicle having a continuously variable transmission, and a fluid operated transfer clutch for transmitting the output of the transmission to auxiliary drive wheels is disclosed. A transfer control valve is provided for changing the amount of oil supplied to the transfer clutch to selectively engage the clutch, and a three-way solenoid operated control valve is provided for controlling oil supplied to the transfer control. The solenoid operated control valve has a first port communicated with a pump, a second port communicated with the transfer control valve, a drain port, a valve body selectively closing the first port and the drain port. The solenoid operated control valve is operated by a pulse train. The duty ratio of the pulse train is controlled for rendering amount of drain oil from the drain port minimum at the changing the amount of the oil to the transfer clutch between the engagement and disengagement of the clutch.

4 Claims, 9 Drawing Sheets

SYSTEM FOR CONTROLLING A TRANSFER CLUTCH OF A FOUR-WHEEL DRIVE VEHICLE

BACKGROUND OF THE INVENTION

The present invention relates to a control system for four-wheel drive vehicle having a continuously variable transmission, and more particularly to a system for controlling a transfer clutch for establishing the four-wheel drive.

Japanese Patent Application Laid Open 60-64035 discloses a four-wheel drive vehicle of the type in which a transfer clutch is provided for transmitting the output torque of a transmission to auxiliary drive wheels. In such a vehicle, a power transmission train can be converted from a two-wheel drive system to a four-wheel drive system by engaging the transfer clutch in accordance with various driving conditions such as rapid start, rapid acceleration or deceleration of the vehicle and skidding. The driving conditions are detected by the difference between rotational speeds of front and rear wheels, depressions of an accelerator pedal and brake pedal and position of a shift lever.

Figure 7:
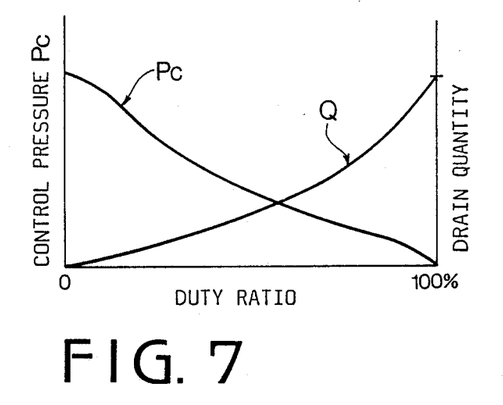
FIG. 7 is a graph showing relationships between clutch control pressure, drain quantity and duty ratio of a control signal in a conventional transfer clutch control system.
Figure 8:
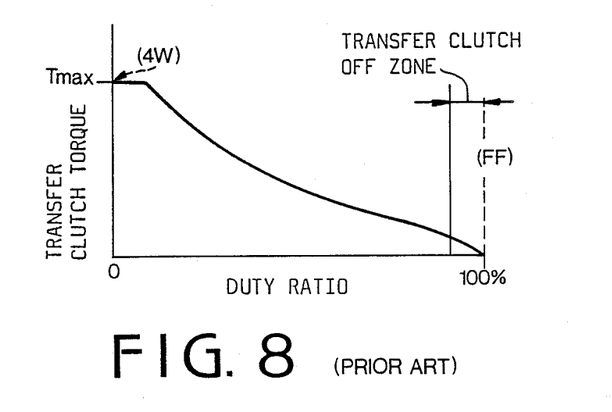
FIG. 8 shows a relationship between the duty ratio and clutch torque in the conventional system.

In such a vehicle, the transfer clutch is provided with a hydraulic control circuit having a solenoid operated two-way valve and a transfer control valve. Relationships between duty ratio of the pulses applied to a solenoid of the valve and control pressure $P_C$ applied to the transfer control valve, and quantity Q of drain from the solenoid operated valve are shown in FIG. 7, and a relationship between the duty ratio and clutch torque of the transfer clutch is shown in FIG. 8. Namely, when the duty ratio is 100%, drain quantity Q is maximum and control pressure $P_C$ is at a minimum value. Accordingly, a transfer clutch pressure applied to the transfer clutch becomes minimum, thereby rendering the transfer clutch torque minimum to disengage the clutch, for providing the two-wheel driving.

In a control system for a known continuously variable transmission disclosed in Japanese Patent Application Laid Open 61-105352, even if the transmission ratio is quickly changed, amount of oil supplied to servo devices of pulleys are controlled so as not to exceed a volumetric displacement of a pump, thereby preventing slipping of a belt on the pulleys. In the system, when the engine speed is in a low range, the displacement of the pump is small. Moreover, as shown in FIG. 7, when two-wheel driving mode is selected, a pulse train at a duty ratio 100% is applied to the solenoid operated valve so that the drain quantity Q is at maximum. Accordingly, if the two-wheel driving is selected at low engine speed, the amount of oil supplied to the transfer clutch is insufficient for establishing the two-wheel driving. Consequently, a pump having a large capacity must be installed.

SUMMARY OF THE INVENTION

The object of the present invention is to provide a system for controlling a transfer clutch for a four-wheel drive vehicle where sufficient hydraulic pressure can be obtained at the changing of the driving between the two-wheel driving and the four-wheel driving.

According to the present invention, there is provided a control system for a four-wheel drive vehicle having an engine, a continuously variable transmission, and a fluid operated transfer clutch for transmitting the output of the transmission to auxiliary drive wheels.

The system comprises a hydraulic circuit having a pump for supplying oil to the transfer clutch, a transfer control valve having a spool and provided in the hydraulic circuit, a solenoid operated control valve for controlling oil for shifting the spool of the transfer control for changing oil supplied to the transfer clutch to selectively engage the clutch, the solenoid operated control valve having a first port communicated with the pump, a second port communicated with the transfer control valve for applying oil to the spool, a drain port, a valve body selectively closing the first port and the drain port and a solenoid for operating the valve body, a control unit for applying a pulse train to the solenoid, the control unit being arranged to control duty ratio of the pulse train for rendering amount of drain oil from the drain port minimum at the changing of the oil to the transfer clutch between the engagement and disengagement of the clutch.

In an aspect of the invention, the valve body is a ball urged by a spring to close the first port, the duty ratio is set to 100% to open the first port to close the drain port for engaging the transfer clutch, and to 0% to close the first port to open the drain port for disengaging the transfer clutch.

These and other objects and features of this invention will become understood from the following description with reference to the accompanying drawings.

DETAILED DESCRIPTION OF THE PREFERRED EMBODIMENT

Figure 1:
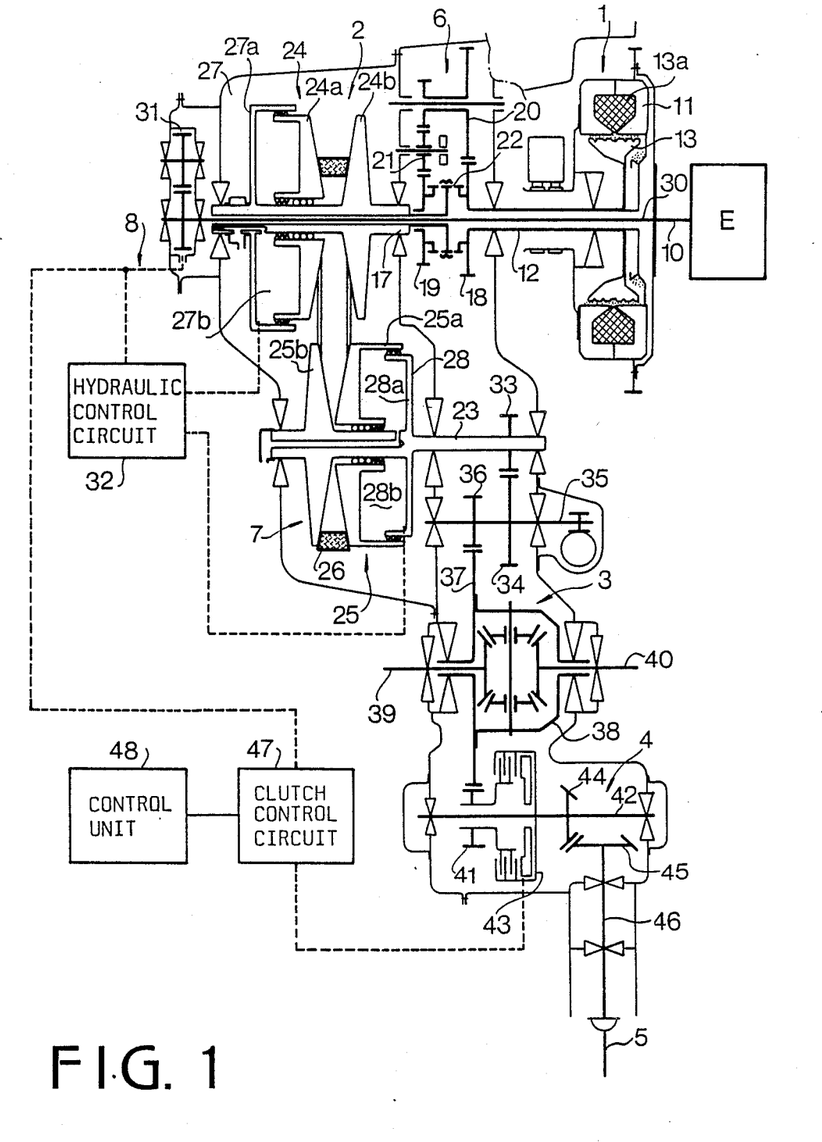
FIG. 1 is a schematic diagram of a continuously variable belt-drive transmission to which the present invention is applied.

FIG. 1 shows a four-wheel drive power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a 15 selector device 6, a continuously variable belt-drive transmission 2, a final reduction device 3 for front wheels, and a transfer device 4. A crankshaft 10 of the engine E is connected to an annular drive member 11 of the electromagnetic powder clutch 1. The electromagnetic powder clutch 1 comprises a driven member 13 secured to an input shaft 12 of the belt-drive transmission 2 and a magnetizing coil 13a provided in the drive member 11. Magnetic powder is provided in a gap between the drive member 11 and driven member 13.

When the magnetizing coil 13a is excited by the clutch current, drive member 11 is magnetized to produce a magnetic flux passing through the driven member 13. The magnetic powder is aggregated in the gap by the magnetic flux and the driven member 13 is engaged with the drive member 11 by the powder. On the other hand, when the clutch current is cut off, the drive and driven members 11 and 13 are disengaged from one another.

The selector device 6 is provided between the input shaft 12 and a main shaft 17. The main shaft 17 is cylindrical and is disposed coaxially with the input shaft 12. The selector device 6 comprises a drive gear 18 integral with input shaft 12, reverse driven gear 19 rotatably mounted on the main shaft 17, and a synchronizer 22 mounted on the main shaft 17. The drive gear 18 meshes with one of counter gears 20. Another gear of the counter gear 20 engages with an idler gear 21 which in turn engages with the driven gear 19.

The synchronizer 27 has a well known mechanism and comprises a hub secured to the main shaft 17, a synchronizer sleeve slidably engaged with the hub with splines. The synchronizer sleeve 29 is adapted to engage with splines of the drive gear 18 or with splines of driven gear 19.

At a neutral position (N range) or a parking position (P range) of a selector lever (not shown), the synchronizer 22 does not engage either gear, so that the main shaft 17 is disconnected from the input shaft 12. When the synchronizer 22 is engaged with the gear 18, the input shaft 12 is connected to the main shaft 17 through the gear 18 and synchronizer 22 to provide a drive range position (D range). When the synchronizer 22 is engaged with the gear 19, the input shaft 12 is connected to the main shaft 17 through gears 18, 20, 21 and 19 to provide a reverse drive range position (R range).

The main shaft 17 has an axial passage in which an oil pump driving shaft 30 connected to crankshaft 10 is mounted. In the transmission 2, an output shaft 23 is provided in parallel with the main shaft 17. A drive pulley 24 and a driven pulley 25 are mounted on shafts 17 and 23. A fixed conical disc 24b of the drive pulley 24 is integral with main shaft 17 and an axially movable conical disc 24a is axially slidably mounted on the main shaft 17. The movable conical disc 24a also slides in a cylinder 27a secured to the main shaft 17 to form a servo device 27 having a chamber 27b.

A fixed conical disc 25b of the driven pulley 25 is formed on the output shaft 23 opposite the movable disc 24a and a movable conical disc 25a is slidably mounted on the shaft 23 opposite disc 24b. Movable conical disc 25a also slides in a cylinder 28a secured to the output shaft 23 to form a servo device 28. Chambers 27b and 28b of the servo devices 27 and 28 are communicated with the oil pump 31 through a passage 8 and a oil hydraulic control circuit 32. A drive belt 26 engages with the drive pulley 24 and the driven pulley 25. The movable disc 24a has an area exposed to the line pressure which is larger than the corresponding area of the movable disc 25a.

Secured to the output shaft 23 is a drive gear 33 which engages with an intermediate reduction gear 34 on an intermediate shaft 35. An intermediate gear 36 on the shaft 35 enages with a final gear 37. Rotation of the final gear 37 is transmitted to axles 39 and 40 of front driving wheels through a differential 38.

The transfer device 5 comprises a transfer gear 41 engaged with the final gear 37 and rotatably mounted on a transfer shaft 42 which is transversely disposed and rotatably supported by bearings and a transfer clutch 43 in the form of a fluid operated multiple-disk friction clutch. The transfer clutch 43 operates to couple the gear 41 with the shaft 42, so that the rotation of the gear 41 is transferred to rear drive wheels through shaft 42, bevel gear 44 secured to the shaft, bevel gear 45 engaged with the bevel gear 44, rear drive shaft 46 and propeller shaft 5. The transfer clutch 43 is communicated to the pump 31 through a clutch control circuit 47 which is operated by a control unit 48.

Figure 2:
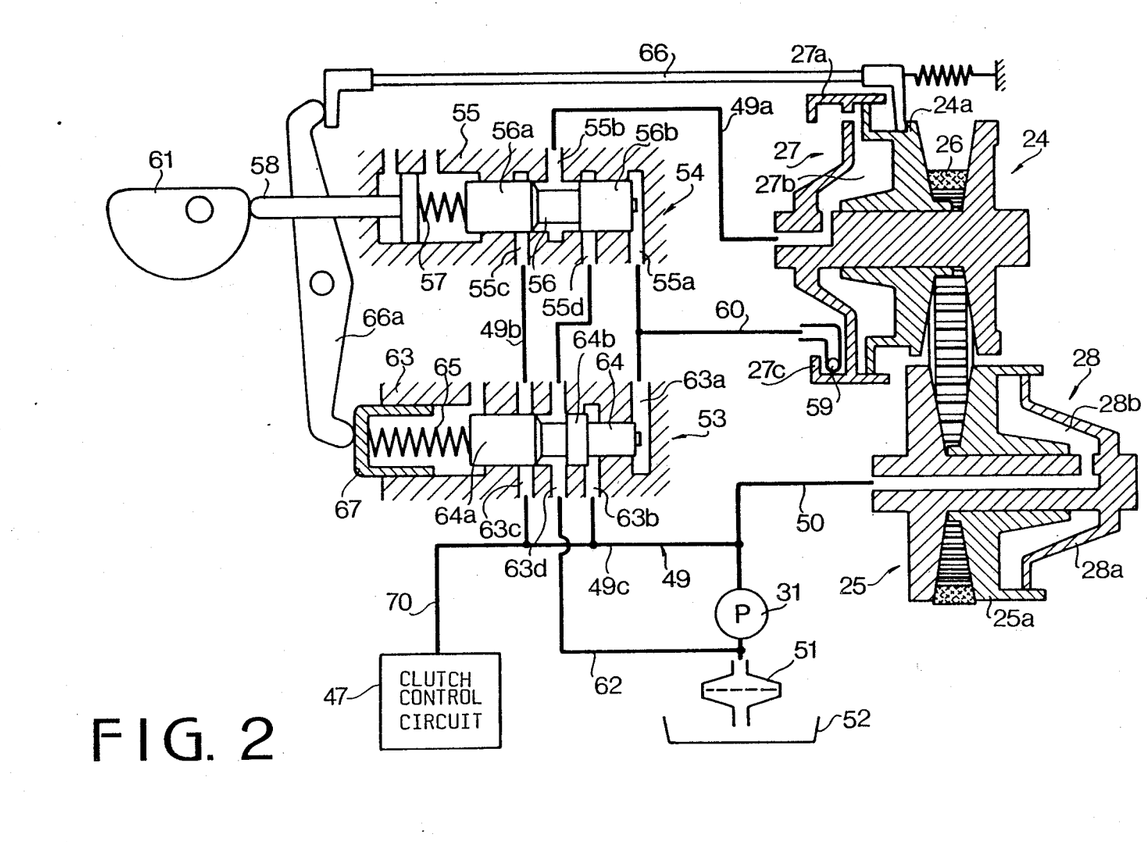
FIGS. 2 and 3 show a hydraulic control circuits according to the present invention.

FIG. 2 shows the hydraulic control circuit 32 for the automatic transmission 2. The circuit is provided with a pressure regulator valve 53 and a transmission ratio control valve 54.

The chamber 27b of servo device 27 is applied with pressurized oil by the oil pump 31, from an oil reservoir 52 passing through a filter 51, conduit 49, pressure regulator valve 53 and transmission ratio control valve 54. The chamber 28b of servo device 28 is applied with pressurized oil through passage 50 without passing through valves 53 and 54. The movable conical disc 24a of the drive pulley 24 is so designed that the pressure receiving area thereof is larger than that of movable conical disc 25a of the driven pulley 25.

The drive pulley cylinder 27a has an annular inside groove 27c in which a rotation speed sensor 59 in the form of a pitot tube is provided for measuring the speed of the oil in the groove that is the speed of the main shaft 17 which is proportional to the engine speed.

The transmission ratio control valve 54 comprises a valve body 55, spool 56, spring 57 for urging the spool in the downshift direction, and actuating member 58 for the spool 56 and the spring 57. The actuating member 58 engages a shift cam 61. The shift cam 61 is operatively connected to an accelerator pedal of the motor vehicle so as to be rotated in dependence on the magnitude of depression of the pedal. A port 55b of the valve 54 is selectively communicated with a pressure oil supply port 55c or a drain port 55d in accordance with the position of lands 56a and 56b of spool 56. Port 55b communicates with chamber 27b through a conduit 49a, and port 55c communicates with pressure regulator valve 53 through a conduit 49b. The drain port 55d communicates with the oil reservoir 52 through ports 63f and 63d and a conduit 62. An end chamber 55a of the transmission ratio control valve 54 is applied with the pitot pressure from the pitot pipe 59 provided in the drive pulley 24 through a passage 60.

Thus, the spool 56 is shifted in dependence on the pitot pressure dependent on the engine speed and on the pressure by the spring 57 dependent on the magnitude of depression of the accelerator pedal. The amount of oil supplied to the chamber 27b increases with increase of engine speed to provide the upshift of the transmission.

Figure 3:
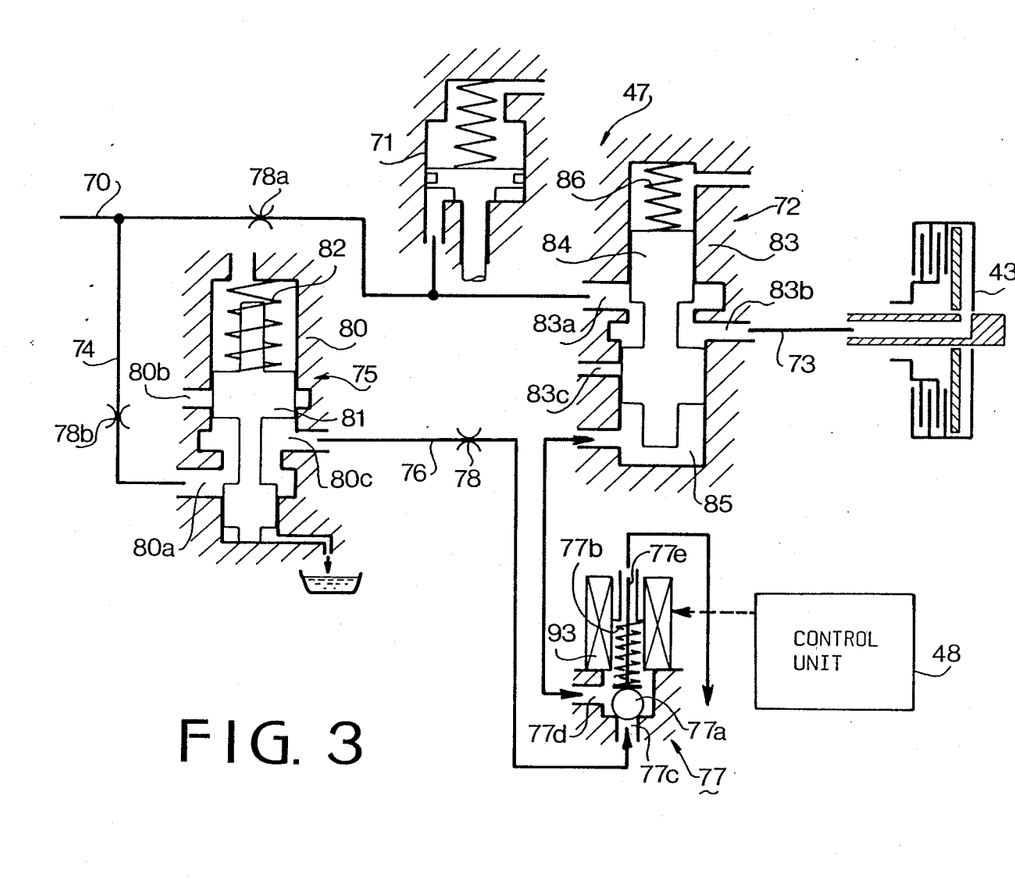

The pressure regulator valve 53 comprises a valve body 63, spool 64, and a spring 65 for urging the spool 64 to the right. A land 64b of the spool 64 is applied with pressure of the pressure oil supplied through a conduit 49c and a port 63b, so that the spool 64 is moved to the left by the oil pressure at the port 63b. A first end chamber 63a of the pressure regulator valve 53 is applied with the pitot pressure from the pitot pipe 59 through the passage 60. The other end of spring 65 engages with a slidable spring retainer 67 which is moved through an arm 66a and a rod 66. The rod 66 engages the disc 24a of the drive pulley 24 for detecting transmission ratio during operation. A port 63c connected with conduit 49c is communicated with a conduit 49b. A port 63d is communicated with the oil reservoir 52 through a conduit 62. The spool 64 is shifted to the right and to the left by the pitot pressure and the urging of the spring. Therefore, line pressure is controlled in accordance with the communication of the port 63c with the conduit 62. The spool 64 is applied with the pitot pressure, with the pressure applied to the chamber 28b, and with the pressure of the spring 65 dependent on the transmission ratio. When the engine speed increases, the pitot pressure increases. Thus, the spool 64 is shifted to the left so that the line pressure decreases. On the other hand, as the transmission ratio increases, the rod 66 moves to the left to rotate the arm 66a in the counterclockwise direction. Thus, the spool 64 is shifted to the right, so that the line pressure is increased. Accordingly, the belt 26 is always held by proper pressure of movable discs 24a and 25a in accordance with the transmission ratio. The passage 49c is further communicated with the hydraulic clutch control circuit 47 which is shown in FIG. 3.

The control circuit 47 comprises a pressure regulator valve 75, a transfer clutch control valve 72 for changing the oil supplied to the transfer clutch, a solenoid operated control valve 77, an accumulator 71 and a control unit 48. The pressure regulator valve 75 comprises a valve body 80, spool 81, chamber 80b, spring 82 for urging the spool to the chamber 80c. The chamber 80c is communicated with the pump 31 through port 80a, a passage 70 with an orifice 78a and a passage 74 having an orifice 78b. The spool 81 is shifted by the difference between forces exerted on both ends thereof, one of which is the pressure of oil in the chamber 80c and the other is force exerted by the spring 82. When the spool 81 is upwardly shifted, a drain port 80b opens, thereby draining the oil in the chamber 80c. When the spool 81 is downwardly shifted, the port 80a opens, so that oil is supplied to the chamber 80c through passage 74. Thus, the pressure of oil in the chamber 80c is kept constant.

The transfer clutch control valve 72 comprises a valve body 83, spool 84 having two pistons which are different in diameter, end chamber 85 communicated with the chamber 80c of the pressure regulator valve 75 through the solenoid operated valve 77 and a passage 76 having an orifice 78. A port 83a of the valve 72 is communicated with the passage 70 through an orifice 78a, and a port 83b is communicated with the piston chamber of the transfer clutch 43 through a passage 73. When the spool 84 is move downwardly by a spring 86, 83a port is closed and drain port 83c is opened, so that clutch pressure $P_T$ applied to the transfer clutch 43 decreases. To the contrary, when the spool 84 is upwardly shifted by control pressure $P_c$ at chamber 85, port 83a opens to increase the clutch pressure $P_T$.

Thus, equation for the control pressure $P_c$, clutch pressure $P_T$, force F exerted by the spring 154, the area S1 of a large diameter piston and the area S2 of a small diameter piston, is $$P_c \cdot S2 + P_t(S1 - S2) = F$$

Therefore $$P_T = (S1 \cdot Pb - F)/(S1 - S2)$$
$$= \{S1/(S1 - S2)\}Pc - F/(S1 - S2)$$

Since S1, S2 and F are constant, the clutch pressure $P_T$ is proportional to the control pressure $P_c$.

The accumulator 71 is provided for accumulating the oil for the transfer clutch 43 when the oil is suddenly applied to the transfer clutch 43. The accumulator 71 may be obviated if sufficient amount of oil can be supplied to the transfer clutch 43.

The solenoid operated control valve 77 is a normally open three-way valve having a solenoid 93, ball 77a, port 77c communicated with the chamber 80c of the pressure regulator valve 80 through the passage 76, port 77d communicated with the chamber 85 of the transfer clutch control valve 72, drain port 77e and spring 77b. The spring 77b urges the ball 77a to close the port 77c. When the solenoid 93 is energized by a pulse train applied from the control unit 48, the ball 77a is lifted to open the port 77c. Consequently, control pressure is applied to the chamber 85 of the transfer clutch control valve 72 through ports 77c and 77d. Accordingly, the port 83a of the transfer clutch control valve 72 is opened so as to apply clutch pressure to the transfer clutch 43.

Figure 9:
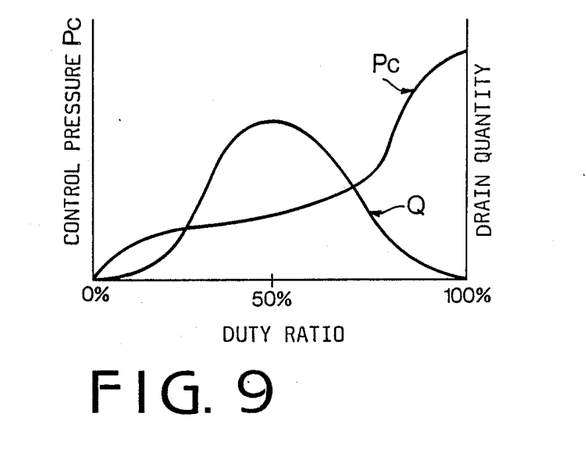
FIG. 9 is a graph showing relationships between clutch control pressure, drain quantity and duty ratio in a system of the present invention.

As shown in FIG. 9, the amount of drain Q from the drain port 77e passing through the passage 76 and port 77c, is zero when duty ratio of the pulse train is at 0%, because the port 77c is closed by the ball 77a. The amount Q increases as the duty ratio increases since the ball 77a is raised to open the port 77c and thereafter becomes zero at the duty ratio 100%. On the other hand, the control pressure $P_c$ is increased as the duty ratio is increased from 0% to 100%.

Figure 10:
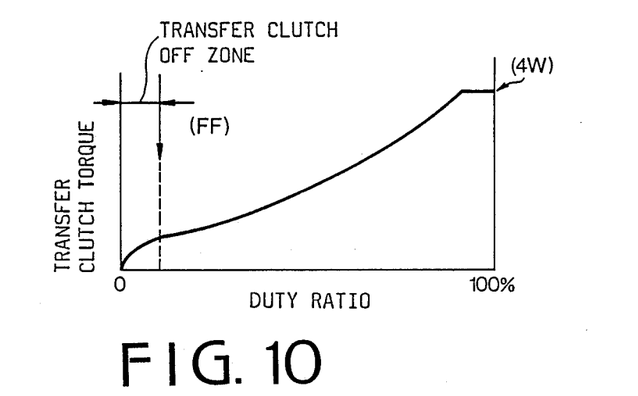
FIG. 10 shows a relationship between duty ratio and clutch torque in the system of the present invention.

FIG. 10 shows a relationship between the clutch torque and duty ratio. When the duty ratio is at 0%, the control pressure $P_c$ is at a minimum value. Thus, the clutch torque is zero, which means disengagement of the clutch. As the duty ratio increases, the control pressure $P_c$ increases, thereby increasing the clutch torque. When the duty ratio is 100%, the clutch torque is at the largest value so that four-wheel drive is established.

Figure 4:
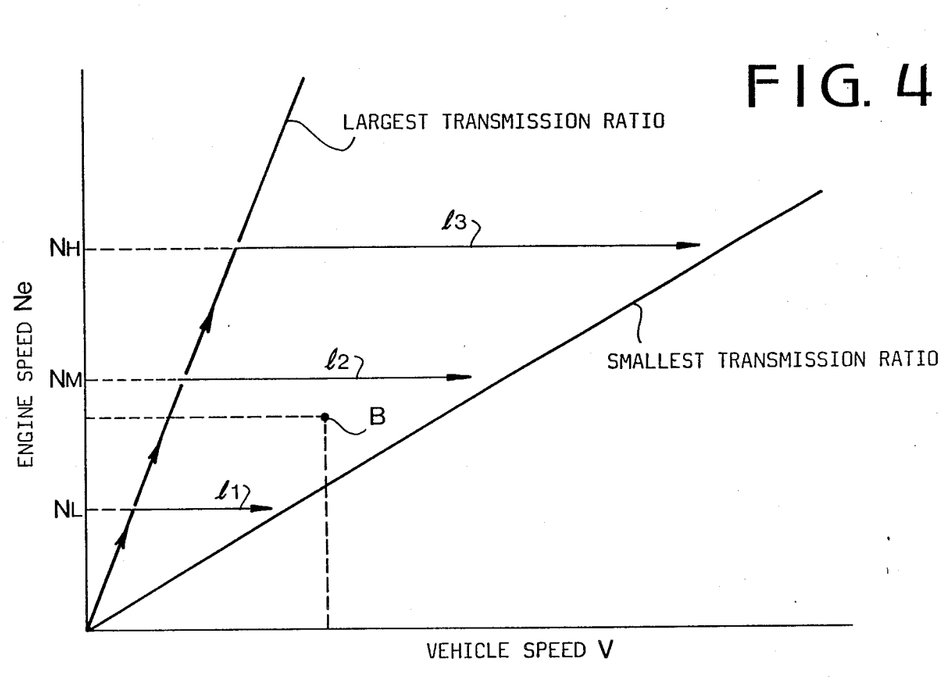
FIG. 4 shows a relationship between vehicle speed and engine speed.

The relationship between vehicle speed V and engine speed Ne of a vehicle having the continuously variable belt-drive transmission has a pattern in accordance with load as shown in FIG. 4. Namely, at a light load, the transmission ratio changes along a transmission ratio changing line $l_1$ at a low engine speed $N_L$, at a middle load, the transmission ratio changes along a line $l_2$ at an engine speed $N_M$, and at a heavy load, the transmission ratio changes along a line $l_3$ at a high engine speed $N_H$. Accordingly, a throttle valve position B can be provided from the graph of FIG. 4 in dependency on the engine speed Ne and vehicle speed V. Thus, engine torque Te can be obtained from throttle position and engine speed.

Figure 5:
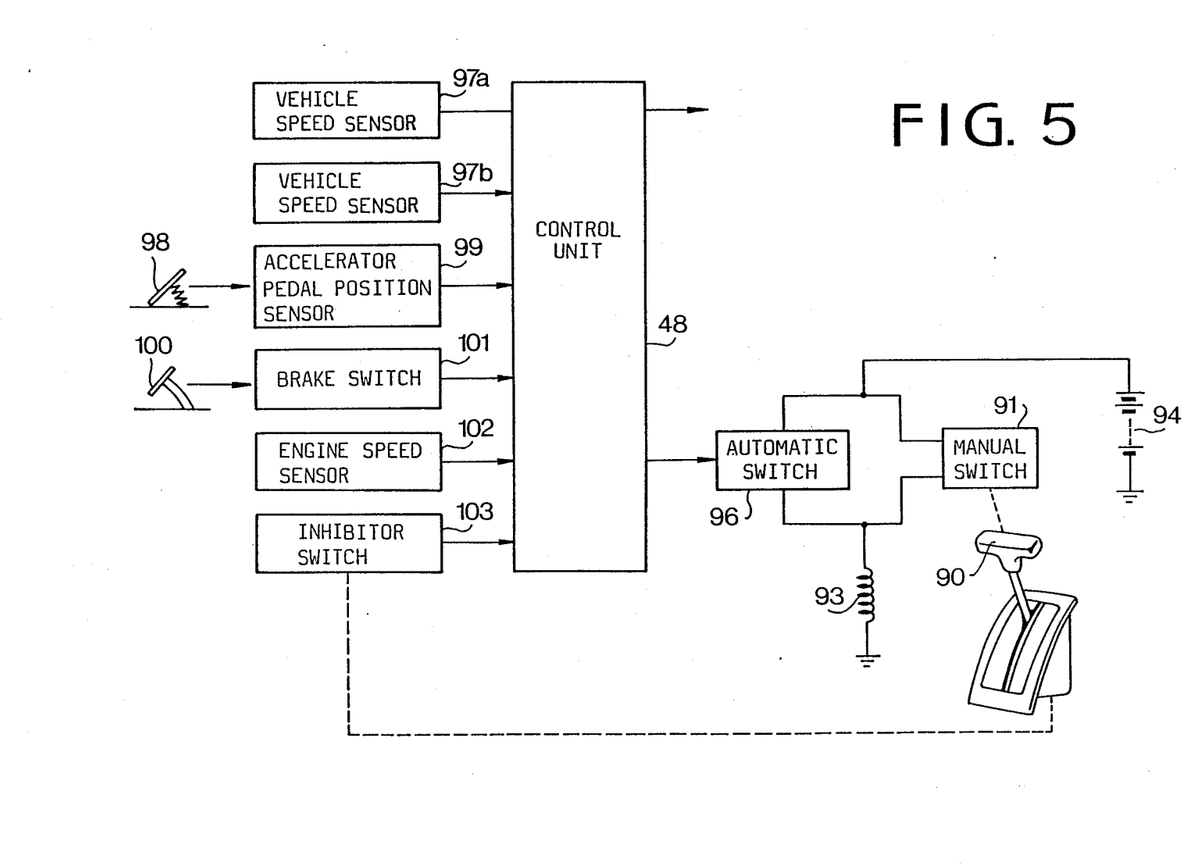
FIG. 5 is a schematic diagram of a control system of the present invention.

Referring to FIG. 5 showing a control system of the present invention, a manual switch 91 for switching the driving modes between four-wheel driving mode and two-wheel driving mode is provided adjacent a shift lever 90. The switch 91 is connected in series with the solenoid 93 of the solenoid operated valve 77 and a battery 94. An automatic switch 96 is further provided in parallel with the manual switch 91, for automatically establishing the four-wheel driving regardless of the position of the manual switch 91 in accordance with a control signal from the control unit 48.

The system has a vehicle speed sensor 97a for detecting vehicle speed in dependency on front-wheel rotational speed, vehicle speed sensor 97b for detecting vehicle speed in dependency on rear-wheel rotational speed, an accelerator pedal position sensor 99 for detecting the depressing degree of a accelerator pedal 98, a brake switch 101 for sensing the depression of a brake pedal 100, an engine speed sensor 102 and an inhibitor switch 103 provided on the shift lever 90. When the N range or P range is selected by the shift lever 90, the inhibitor switch 103 is closed so as to inhibit the mode changing operation of the control unit 48.

The output signals of the sensors and switches are applied to the control unit 48 in order to determine the driving modes such as vehicle start mode, accelerating mode, steady driving mode, so that the transmission ratio may be controlled. Moreover, when a driving range other than N range or P range is determined in accordance with the output signal of the inhibitor switch 103, the four-wheel driving mode or a two-wheel driving mode is determined, thereby controlling the solenoid 93 of the solenoid operated valve 77.

Figure 6A:
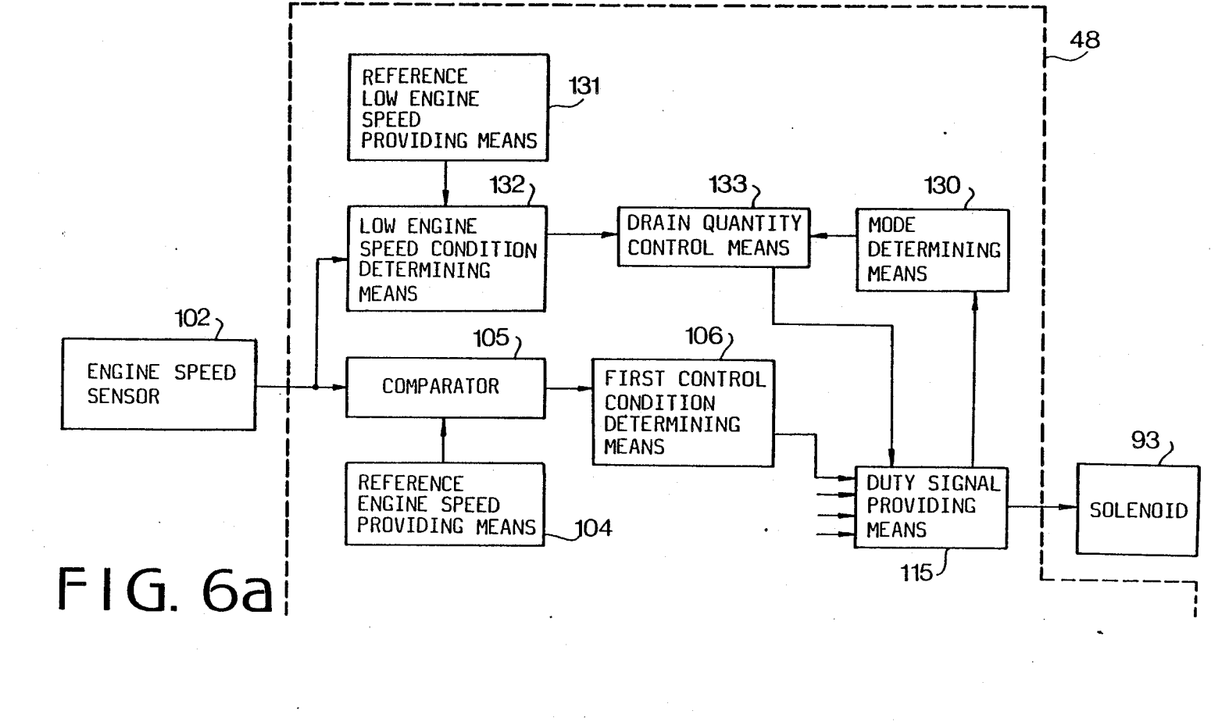
FIGS. 6a and 6b show a block diagram of a control unit of the present invention.
Figure 6B:
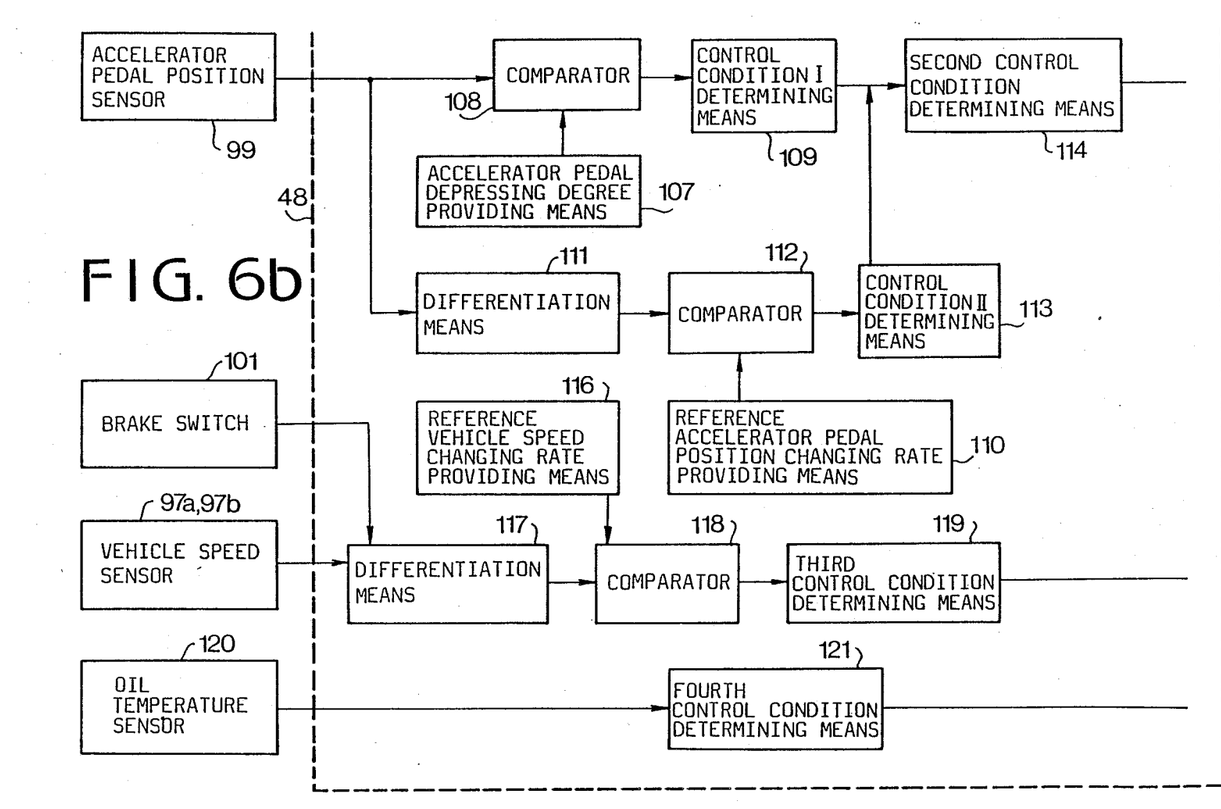

Referring to FIGS. 6a and 6b, the control unit 48 is provided with a reference engine speed providing means 104 where a reference engine speed is set. The reference engine speed is applied to a comparator 105 to which an actual engine speed from the engine speed sensor 102 is also applied. An output signal of the comparator 105 is fed to a first control condition determining means 106 where a first driving condition is determined when the engine speed is smaller than the reference engine speed. A first condition signal from the first control condition determining means 106 is applied to a duty signal providing means 115.

The control unit 48 has a reference accelerator pedal depressing degree providing means 107 where a reference depressing degree is set, a comparator 108 to which an actual pedal depressing degree is fed so as to be compared with the reference degree. The output signal of the comparator 108 is fed to a control condition I determining means 109 where a control condition I is determined when the actual accelerator pedal depressing degree is larger than the reference degree. The accelerator pedal depressing degree is further fed to a differentiation means 111. An output signal of the differentiation means 111 representing the rate of the depression is fed to a comparator 112 where a differentiation of the depressing degree is compared with a reference depressing degree changing rate from a reference accelerator pedal position changing rate providing means 110. An output signal of the comparator 112 is fed to a control condition II determining means 113 where control condition II is determined when the differentiation is larger than the reference rate. The output signals of the control condition I determining means 109 and control condition II determining means 113 are fed to a second control condition determining means 114 which applies an output signal to the duty signal providing means 115 when the vehicle is under the condition I or II. The duty signal providing means 115 applies a duty signal to the solenoid 93 of the solenoid operated valve 77 so as to provide the transfer clutch 43 with hydraulic pressure, thereby establishing a four-wheel drive mode.

The control unit 48 is further provided with a differentiation means 117 where vehicle speed V is differentiated when the brake switch 101 is closed. A differentiation is applied to a comparator 118 to which a reference vehicle speed changing rate from a reference vehicle speed changing rate providing means 116 is applied. A third control condition determining means 119 determines third control condition when the differentiation is larger than the reference rate. An output signal of an oil temperature sensor 120 is applied to a fourth control condition determining means 121 where fourth control condition is determined when the oil temperature is higher than a predetermined reference temperature. Output signals of the third and fourth control condition determining means 119 and 121 are applied to the duty signal providing means 115 so as to correct the duty signal.

In accordance with the present invention, a reference low engine speed providing means 131 is provided in the control unit 48. A reference low engine speed is fed to a low engine speed condition determining means 132 to which the engine speed is applied. When the engine speed is lower than the reference engine speed, the determining means 132 applies a signal to a drain quantity control means 133 to which an output signal of a mode determining means 130 is fed. When it is determined that the four-wheel driving mode is selected by the determining means 130 in dependence on an output signal of the duty signal providing means 115, the drain quantity control means 133 applies a signal to the duty signal providing means 115, thereby controlling the amount of oil drained from the port 77e of the solenoid operated valve 77.

The operation of the system is described hereinafter. While the vehicle is at a stop, the driven pulley servo chamber 28b is supplied with the line pressure adjusted by the pressure regulator valve 53 through the passage 50, and the drive pulley servo chamber 27b is drained, since the spool 56 is at the right end position by the spring 57. Thus, the driving belt 26 engages with the driven pulley 25 at a maximum running diameter to provide the largest transmission ratio (low speed stage). On the other hand, the selector lever 90 is at the N range position to select the N range, so that the inhibitor switch 103 is closed. When the D range is selected, the input shaft 12 and the main shaft 17 are connected to each other in the selector device 6 by the synchronizer 22. When the acceleration pedal 98 is depressed, the electromagnetic powder clutch 1 is excited by a clutch current, transmitting the engine power to the drive pulley 24. The power of the engine is transmitted to the output shaft 23 at the largest transmission ratio by the driving belt 26 and driven pulley 25, and further transmitted to axles of the driving wheels. Thus, the vehicle is started.

When the pitot pressure rises, the spool 56 is shifted to the right, so that the line pressure is applied to the servo chamber 27b to move the disc 24a to the right. Thus, the upshift of the transmission starts.

When the two-wheel driving mode is manually selected, the manual switch 91 is opened so that the solenoid 93 of the solenoid operated valve 77 is not energized. Accordingly, the port 77c of the solenoid operated valve 77 is closed by the ball 77a, thereby decreasing the control pressure $P_c$ in the chamber 85 of the transfer control valve 72 to a minimum value. As a result, the spool 84 is downwardly shifted to close the port 83a, which causes the clutch pressure $P_T$ to become zero to disengage the transfer clutch 43. Thus, two-wheel drive transmission system is established.

When the four-wheel driving mode is selected, the switch 91 is closed so that the solenoid 93 is applied with pulses having duty ratio of 100%. Thus, the port 77c is opened and the port 77e is closed so as to upshift the spool 84, thereby opening the port 83a. Consequently, the clutch pressure $P_T$ is increased so that tee transfer clutch 43 is completely engaged to establish the four-wheel driving mode.

When the engine speed is lower than the reference speed, if the accelerator pedal 98 is depressed more than the reference degree or if the depressing degree of the accelerator pedal is changed at a higher rate than the reference rate, that is, the first and second control conditions are determined at the determining means 106 and 114 of the control unit 48, respectively, the four-wheel mode is selected. Accordingly, the control unit 48 applies a signal to the automatic switch 96 to close the switch to establish the four-wheel driving mode, although the two-wheel mode may be selected by the driver. Therefore, the duty signal providing means 115 applies a duty ratio signal of 100% to the solenoid 93, thereby applying oil to the transfer clutch 43. The duty ratio is corrected when the vehicle speed changes at a higher rate than the reference rate, or when the oil temperature is higher than the reference value. As a result, an optimum engagement ratio for the transfer clutch 43 is obtained in accordance with the driving conditions.

When the vehicle is started at a wide open throttle, or accelerated at a wide open throttle after decelerating the vehicle, engine speed reduces to a value lower than the reference low engine speed set at the reference low engine speed providing means 131 in which discharging rate of the pump is small. Thus, low engine speed condition is determined at the determining means 132. When the mode determining means 130 determines that the vehicle should be driven under the four-wheel driving, the drain quantity control means 133 applies a signal to the duty signal providing means 115 so as to apply the duty ratio signal to the solenoid 93 at 100% for a predetermined length of time. Accordingly, the drain port 77e of the solenoid operated valve 77 is closed, thereby preventing the drain of oil. As a result, only a minimum amount of oil is required for the valve 77 to effectively operate the transfer clutch 43. When the mode determining means 130 determines the two-wheel driving mode, the duty ratio of the pulses becomes 0% for a predetermined period. Accordingly, the drain quantity is controlled in compliance with the selected driving mode.

The present invention may be modified so as to employ a normally closed solenoid operated valve.

From the foregoing, it will be understood that the present invention provides a control system for a transfer clutch of a four-wheel drive vehicle provided with a continuously variable transmission, where the transfer clutch is applied with a sufficient hydraulic pressure at a low engine speed at which the displacement of the pump is low.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a four-wheel drive vehicle having an engine, a hydraulically operated transmission, and a fluid operated transfer clutch for transmitting an output of the transmission to auxiliary drive wheels, the system comprising:

a hydraulic circuit having a pump for supplying oil to the transfer clutch;

a transfer control valve having a spool and provided in the hydraulic circuit;

a solenoid operated control valve for controlling oil for shifting the spool of the transfer control valve for changing amount of oil supplied to the transfer clutch to selectively engage the clutch;

the solenoid operated control valve having a first port communicated with the pump, a second port communicated with the transfer control valve for applying oil to shift the spool, a drain port, a valve body selectively closing the first port and the drain port and a solenoid for operating the valve body;

a control unit for applying a pulse train to the solenoid, the control unit being arranged to control the duty ratio of the pulse train for rendering the amount of drain oil from the drain port to be a minimum at the changing of the oil to the transfer clutch between the engagement and disengagement of the clutch.

2. The system according to claim 1, wherein the valve body is a ball urged by a spring to close the first port.

3. The system according to claim 1, wherein the transmission is a continuously variable transmission.

4. The system according to claim 2, wherein the duty ratio is set to 100% to open the first port to close the drain port for engaging the transfer clutch, and to 0% to close the first port to open the drain port for disengaging the transfer clutch.

* * * * *